United States Patent
Kosuge et al.

(10) Patent No.: US 9,791,036 B2
(45) Date of Patent: Oct. 17, 2017

(54) DRIVE TRANSMISSION APPARATUS AND IMAGE FORMING APPARATUS

(71) Applicant: FUJI XEROX CO., LTD., Tokyo (JP)

(72) Inventors: Tomoya Kosuge, Kanagawa (JP); Keita Yano, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/001,690

(22) Filed: Jan. 20, 2016

(65) Prior Publication Data
US 2017/0052499 A1    Feb. 23, 2017

(30) Foreign Application Priority Data
Aug. 20, 2015   (JP) .................................. 2015-162650

(51) Int. Cl.
*G03G 15/00*   (2006.01)
*F16H 57/025*  (2012.01)
*G03G 21/16*   (2006.01)

(52) U.S. Cl.
CPC ....... *F16H 57/025* (2013.01); *G03G 15/6529* (2013.01); *G03G 21/1647* (2013.01); *G03G 2221/1657* (2013.01)

(58) Field of Classification Search
CPC .................................................. G03G 15/757
USPC ........................................................ 399/405
See application file for complete search history.

(56) References Cited

U.S. PATENT DOCUMENTS

| | | | | |
|---|---|---|---|---|
| 5,590,871 A | * | 1/1997 | Okabe ....................... | B42C 1/12 270/58.27 |
| 6,157,799 A | * | 12/2000 | Asakura .............. | G03G 21/186 399/121 |
| 2004/0256787 A1 | * | 12/2004 | Wada ................... | B65H 3/0669 271/109 |
| 2009/0131212 A1 | * | 5/2009 | Marumoto ............. | F16H 13/06 475/195 |
| 2009/0196655 A1 | * | 8/2009 | Takigawa ............. | G03G 21/186 399/167 |
| 2013/0065725 A1 | * | 3/2013 | Matsuda .............. | G03G 15/757 475/159 |
| 2013/0302066 A1 | * | 11/2013 | Kawai .................... | G03G 15/50 399/167 |

(Continued)

FOREIGN PATENT DOCUMENTS

JP           2011-140980 A    7/2011

*Primary Examiner* — Anthony Nguyen
(74) *Attorney, Agent, or Firm* — Sughrue Mion, PLLC

(57) ABSTRACT

A drive transmission apparatus includes a drive source; a rotating member that rotates by drive from the drive source; a structure that is attachable to and detachable from a drive transmission apparatus body and at least partly houses a transmission mechanism that transmits the drive from the drive source to the rotating member; a support member that has first and second surfaces, and supports the structure; and a coupling member that is fixed to the support member by a first fixing tool and to the structure by a second fixing tool, and couples the structure with the support member. The coupling member includes a first attachment portion to which the first fixing tool is attached from a side of the first surface of the support member, and a second attachment portion to which the second fixing tool is attached from a side of the second surface of the support member.

5 Claims, 11 Drawing Sheets

(56) References Cited

U.S. PATENT DOCUMENTS

| | | | |
|---|---|---|---|
| 2014/0140726 A1* | 5/2014 | Fukao | G03G 15/1615 399/121 |
| 2014/0294445 A1* | 10/2014 | Ueno | F16H 21/40 399/167 |
| 2015/0097334 A1* | 4/2015 | Sekiguchi | B65H 5/06 271/275 |
| 2015/0212474 A1* | 7/2015 | Ueno | G03G 15/757 399/13 |

* cited by examiner

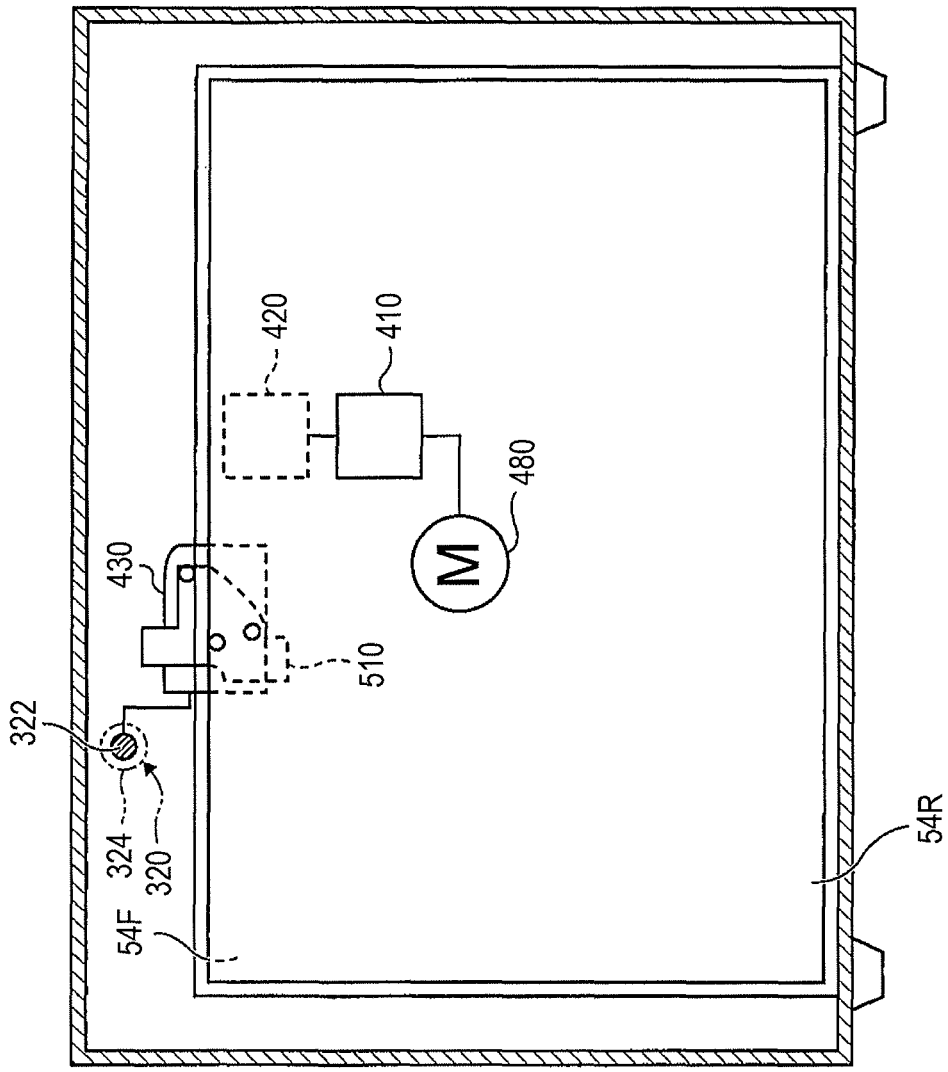

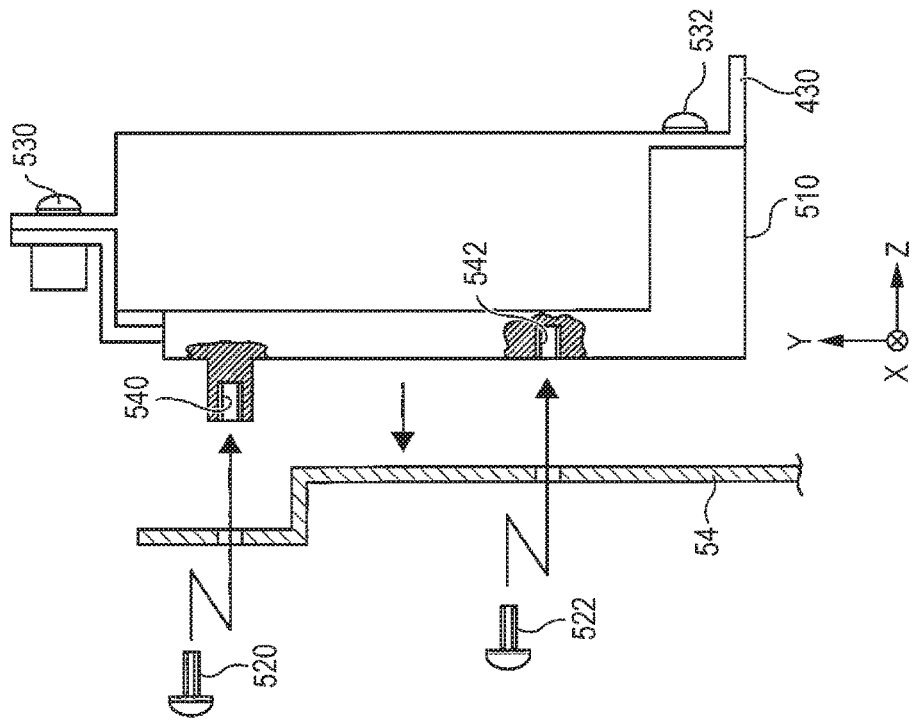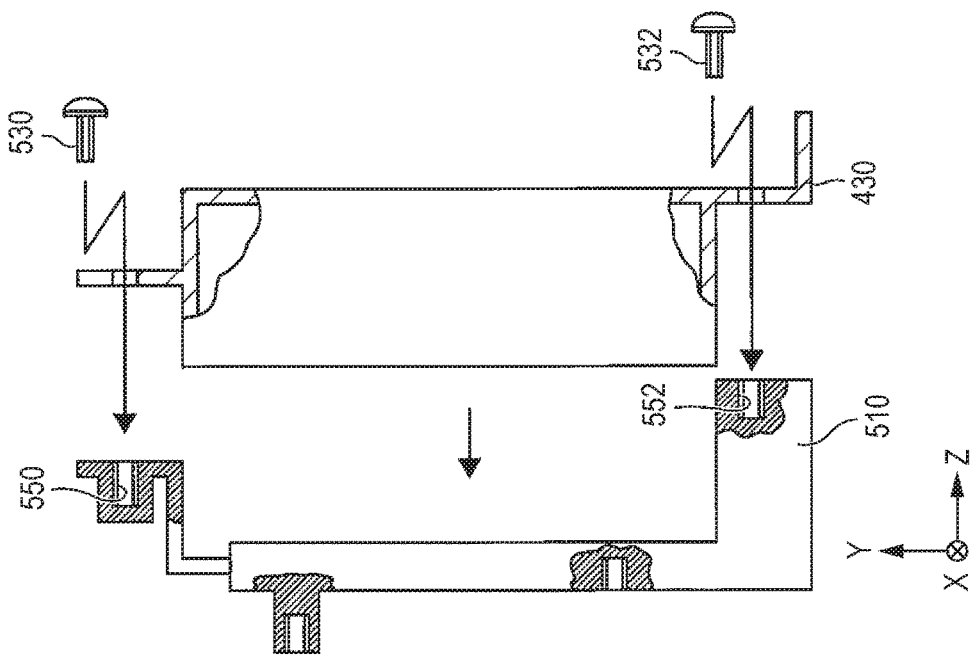

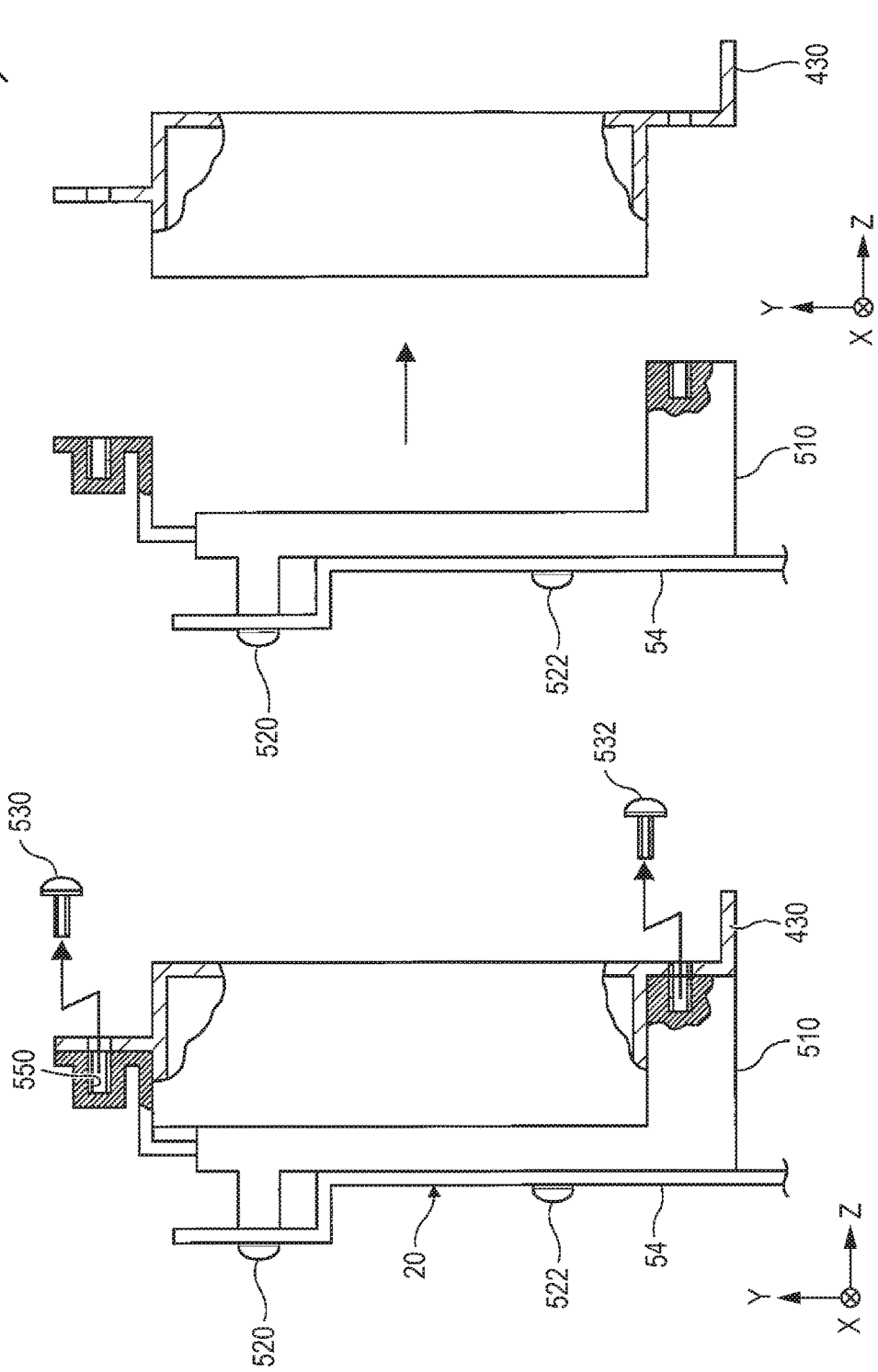

DRIVE TRANSMISSION APPARATUS AND IMAGE FORMING APPARATUS

CROSS-REFERENCE TO RELATED APPLICATIONS

This application is based on and claims priority under 35 USC 119 from Japanese Patent Application No. 2015-162650 filed Aug. 20, 2015.

BACKGROUND

The present invention relates to a drive transmission apparatus and an image forming apparatus.

SUMMARY

According to an aspect of the invention, there is provided a drive transmission apparatus including a drive source; a rotating member that rotates by receiving drive transmitted from the drive source; a structure that is attachable to and detachable from a drive transmission apparatus body and houses at least a portion of a transmission mechanism that transmits the drive from the drive source to the rotating member; a support member that has a first surface and a second surface, and supports the structure; and a coupling member that is fixed to the support member by using a first fixing tool, is fixed to the structure by using a second fixing tool, and couples the structure with the support member. The coupling member includes a first attachment portion to which the first fixing tool is attached from a side of the first surface of the support member, and a second attachment portion to which the second fixing tool is attached from a side of the second surface of the support member.

BRIEF DESCRIPTION OF THE DRAWINGS

An exemplary embodiment of the present invention will be described in detail based on the following figures, wherein:

FIG. 7 is a cross-sectional view showing a cross section taken along plane C shown in FIG. 1 of the image forming apparatus shown in FIG. 1 when viewed from the rear side;

FIGS. 10A and 10B explain a process of attaching the transmission unit shown in FIGS. 8A and 8B to the support member, FIG. 10A being an illustration explaining attachment of the transmission unit to a coupling member, FIG. 10B being an illustration explaining attachment of the coupling member to the support member; and FIGS. 11A and 11B explain a process of detaching the transmission unit shown in FIGS. 8A and 8B from the support member, FIG. 11A being an illustration explaining detachment of a second screw from the coupling member, FIG. 11B being an illustration explaining detachment of the transmission unit from the coupling member.

DETAILED DESCRIPTION

Figure 1:
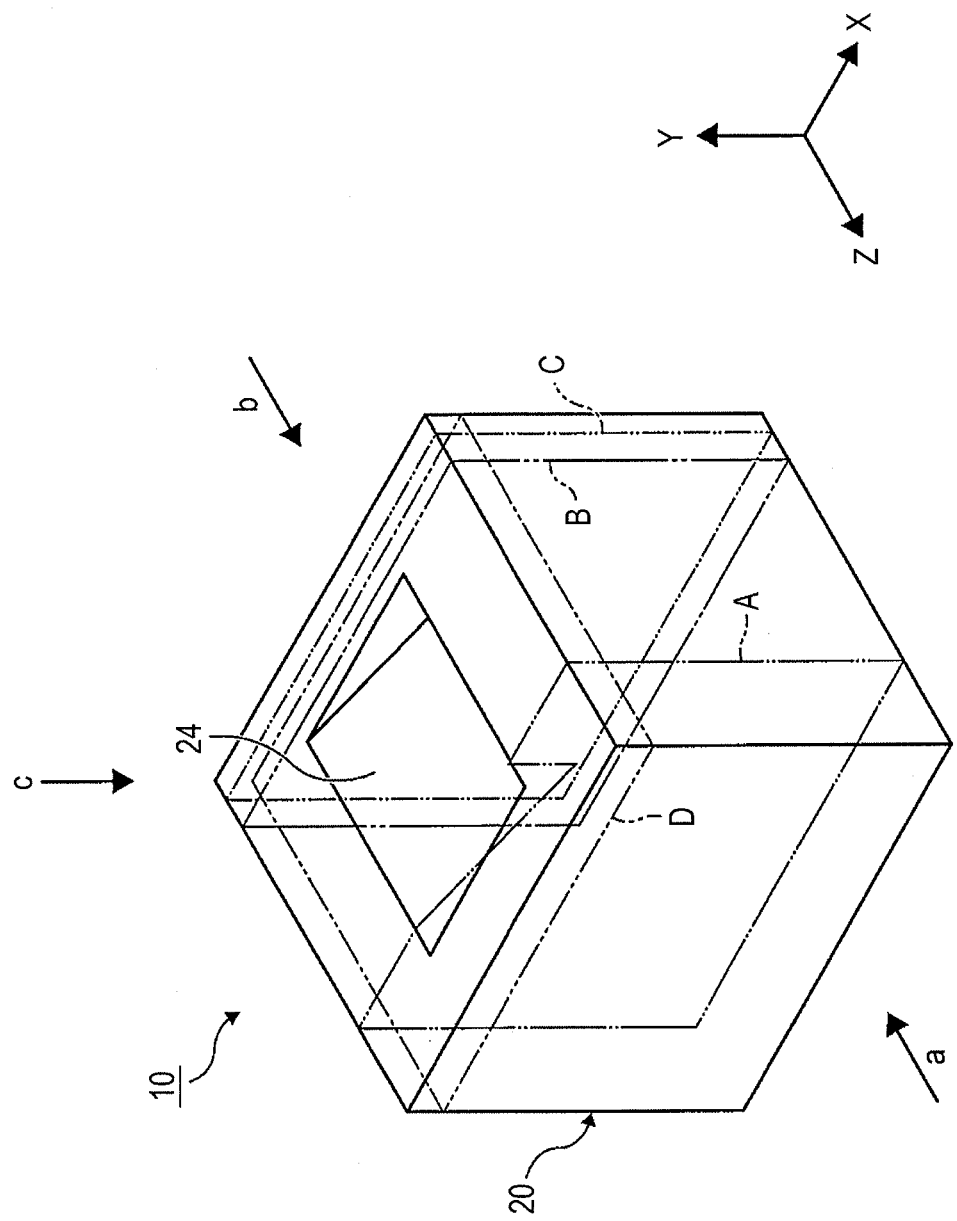
FIG. 1 is a perspective view showing an image forming apparatus according to an exemplary embodiment of the invention.

An exemplary embodiment for implementing the present invention is described below with reference to the drawings. FIG. 1 illustrates an image forming apparatus 10. The image forming apparatus 10 is an image forming apparatus according to an exemplary embodiment of the invention and is also a drive transmission apparatus according to an exemplary embodiment of the invention. The image forming apparatus 10 includes an image forming apparatus body 20 as shown in FIG. 1. The image forming apparatus body 20 is also used as a drive transmission apparatus body. The image forming apparatus body 20 has a recess in an upper surface thereof. A portion of the image forming apparatus body 20 with the recess formed is used as an output portion 24 to which a sheet of paper used as a recording medium is output.

Figure 2:
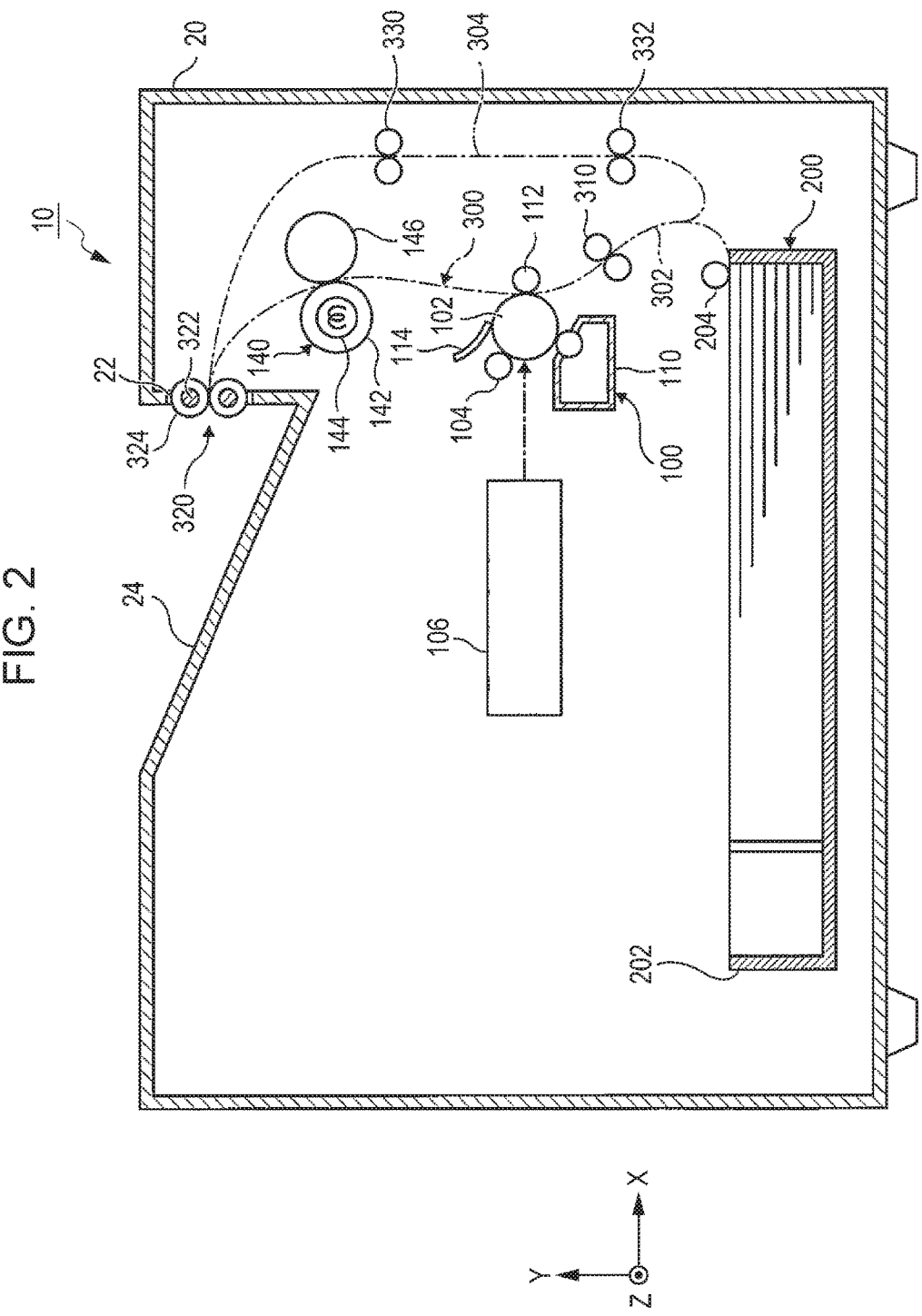
FIG. 2 is a cross-sectional view showing a cross section taken along plane A shown in FIG. 1 of the image forming apparatus shown in FIG. 1 when viewed from the front side.

FIG. 2 illustrates a cross section taken along plane A shown in FIG. 1 of the image forming apparatus 10 when viewed from the front side (the arrow a side in FIG. 1). As shown in FIG. 2, an output opening 22 is formed in the image forming apparatus body 20. A sheet of paper is output to the output portion 24 through the output opening 22.

Also, as shown in FIG. 2, an image forming unit 100 that forms a toner image on a sheet of paper is arranged in the image forming apparatus body 20. The image forming unit 100 includes a photoconductor drum 102 used as an image holding member that holds a toner image; a charging device 104 that uniformly charges the surface of the photoconductor drum 102 with electricity; a latent image forming device 106 that forms an electrostatic latent image on the surface of the photoconductor uniformly charged with electricity by the charging device 104; a developing device 110 that develops the latent image formed by the latent image forming device 106 with a developer containing a toner and a carrier in a mixed manner; a transfer device 112 that transfers the toner image on a sheet of paper, the toner image being formed on the surface of the photoconductor drum 102 by developing the latent image by the developing device 110; and a cleaning device 114 that cleans up the toner and other substances remaining on the surface of the photoconductor drum 102 after the toner image is transferred on the sheet by the transfer device 112.

Also, as shown in FIG. 2, a fixing device 140 that fixes the toner image transferred on the sheet to the sheet is arranged in the image forming apparatus body 20. The fixing device 140 includes a heat roller 142 having a heat source 144 arranged therein, and a pressure roller 146 that presses the sheet against the heat roller 142. The fixing device 140 fixes the toner image to the sheet by heat and pressure.

Also, as shown in FIG. 2, a paper feed device 200 is arranged in the image forming apparatus body 20. The paper feed device 200 is a device that feeds a sheet of paper to the image forming unit 100. The paper feed device 200 includes a paper housing portion 202 that houses stacked sheets of paper, and a send-out roller 204 that sends out the sheets of paper housed in the paper housing portion 202 to a transport path 300 (described later).

Also, as shown in FIG. 2, the transport path 300 for transporting the sheets of paper is arranged in the image forming apparatus body 20. The transport path 300 includes a regular transport path 302 and a reverse transport path 304. The above-described send-out roller 204, a registration roller 310, the above-described transfer device 112, the above-described photoconductor drum 102, the above-described fixing device 140, and an output roller 320 are arranged along the regular transport path 302 sequentially from the upstream side in a paper transport direction of the regular transport path 302. Also, for example, two transport rollers 330 and 332 are arranged along the reverse transport path 304 sequentially from the upstream side in a paper transport direction of the reverse transport path 304.

The registration roller 310 temporarily stops movement of a leading edge portion of a sheet of paper fed from the paper feed device 200, and re-starts the movement of the leading edge portion of the sheet to a transfer part formed by the photoconductor drum 102 and the transfer device 112 to meet a time point at which the toner image is formed on the surface of the photoconductor drum 102.

The transfer device 112 electrostatically transfers the toner image formed on the surface of the photoconductor drum 102 on the sheet by an applied transfer bias.

The output roller 320 is used as a rotating member that rotates by receiving drive from a motor 480 (described later, see FIGS. 3, 5, 6, and 7) that is used as a drive source. Also, the output roller 320 outputs the sheet with the toner image fixed by the fixing device 140 toward the output portion 24 through the output opening 22. Also, after the toner image is formed on a first side of the sheet, if a toner image is also formed on a second side of the sheet, the output roller 320 starts rotating in a reverse direction at a time point at which a portion around a trailing edge portion of the sheet reaches the output roller 320, and the output roller 320 sends out the sheet to the reverse transport path 304 from the trailing edge portion.

Also, the output roller 320 includes a rotating shaft 322 and a roller body portion 324 fixed to the rotating shaft 322 to rotate with the rotating shaft 322. The output roller 320 includes, for example, plural roller body portions 324. For example, the output roller 320 includes four roller body portions 324 (see FIG. 5).

The transport rollers 330 and 332 reverse the sheet with the toner image formed on the first side and transport the sheet toward the registration roller 310.

Figure 3:
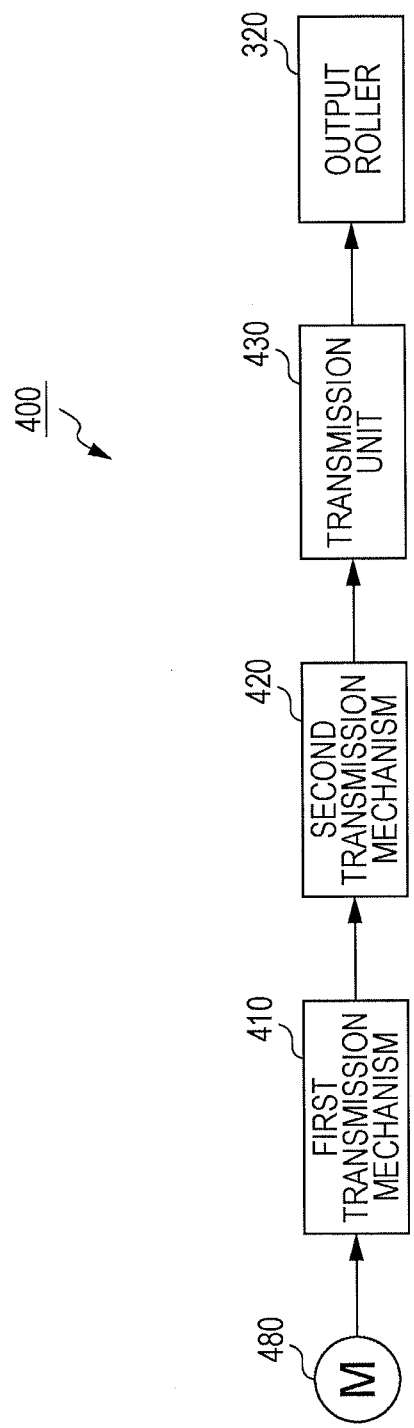
FIG. 3 is a block diagram showing a transmission mechanism that transmits drive to an output roller included in the image forming apparatus shown in FIG. 1.

FIG. 3 is a block diagram showing a configuration of a transmission mechanism 400 that transmits drive to the output roller 320. As shown in FIG. 3, the transmission mechanism 400 includes a first transmission mechanism 410, a second transmission mechanism 420, and a transmission unit 430. Drive is transmitted from the motor 480 to the output roller 320 through the first transmission mechanism 410, the second transmission mechanism 420, and the transmission unit 430.

For each of the first transmission mechanism 410 and the second transmission mechanism 420, for example, a single gear or a gear group including plural gears may be used. The transmission unit 430 is used as a structure that is attachable to and detachable from the image forming apparatus body 20 (see FIG. 1). The details of the transmission unit 430 are described later.

Figure 4:
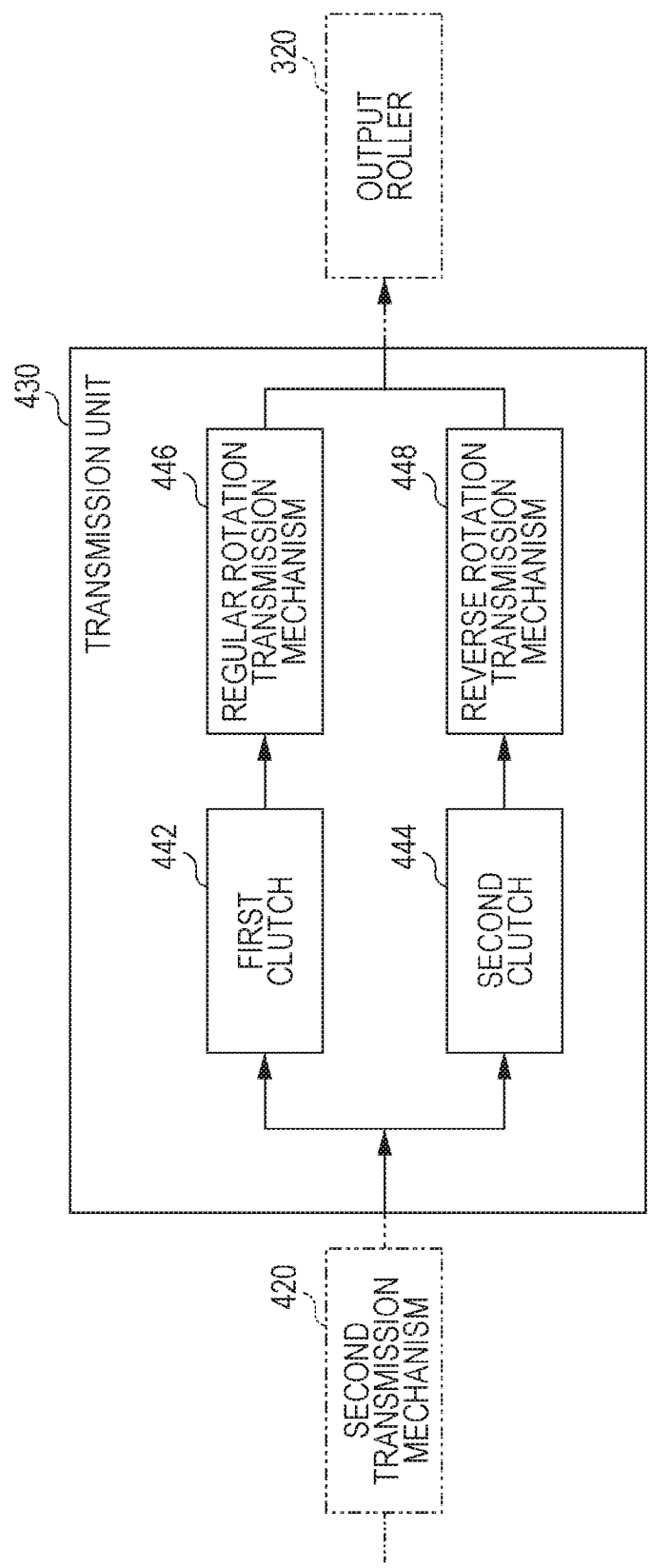
FIG. 4 is a block diagram showing a configuration of a transmission unit forming a portion of the transmission mechanism shown in FIG. 3.

FIG. 4 is a block diagram showing a configuration of the transmission unit 430. As shown in FIG. 4, the transmission unit 430 includes a first clutch 442, a second clutch 444, a regular rotation transmission mechanism 446, and a reverse rotation transmission mechanism 448. The first clutch 442 transmits drive from the second transmission mechanism 420 to the regular rotation transmission mechanism 446 or stops the drive not to be transmitted to the regular rotation transmission mechanism 446 under control by a controller (not shown).

The regular rotation transmission mechanism 446 transmits the drive transmitted from the second transmission mechanism 420 through the first clutch 442 to the output roller 320, and rotates the output roller 320 forward by regular rotation. In this case, it is assumed that regular rotation (forward rotation) of the output roller 320 is rotation of the output roller 320 in a direction in which the output roller 320 outputs a sheet of paper to the output portion 24. For the regular rotation transmission mechanism 446, for example, a single gear or a gear group including plural gears may be used.

The second clutch 444 transmits the drive from the second transmission mechanism 420 to the reverse rotation transmission mechanism 448 or stops the drive not to be transmitted to the reverse rotation transmission mechanism 448 under control by the controller (not shown).

The reverse rotation transmission mechanism 448 transmits the drive transmitted from the second transmission mechanism 420 through the second clutch 444 to the output roller 320, and rotates the output roller 320 backward by reverse rotation. In this case, it is assumed that reverse rotation (backward rotation) of the output roller 320 is rotation of the output roller 320 in a direction in which the output roller 320 transports a sheet of paper to the reverse transport path 304.

In the transmission unit 430 configured as described above, since the controller (not shown) causes the drive to be transmitted to one of the first clutch 442 and the second clutch 444, the rotation direction of the output roller 320 is switched between the regular rotation and the reverse rotation. That is, the first clutch 442 and the second clutch 444 are used as a switching mechanism that switches the rotation direction of the output roller 320.

As described above, a portion of the transmission mechanism 400 that transmits the drive from the motor 480 to the output roller 320 is housed in the transmission unit 430. Instead of housing the portion of the transmission mechanism 400 in the transmission unit 430, the entire transmission mechanism 400 may be housed in the transmission unit 430. That is, the transmission unit 430 is only required to house at least a portion of the transmission mechanism 400.

Figure 5:
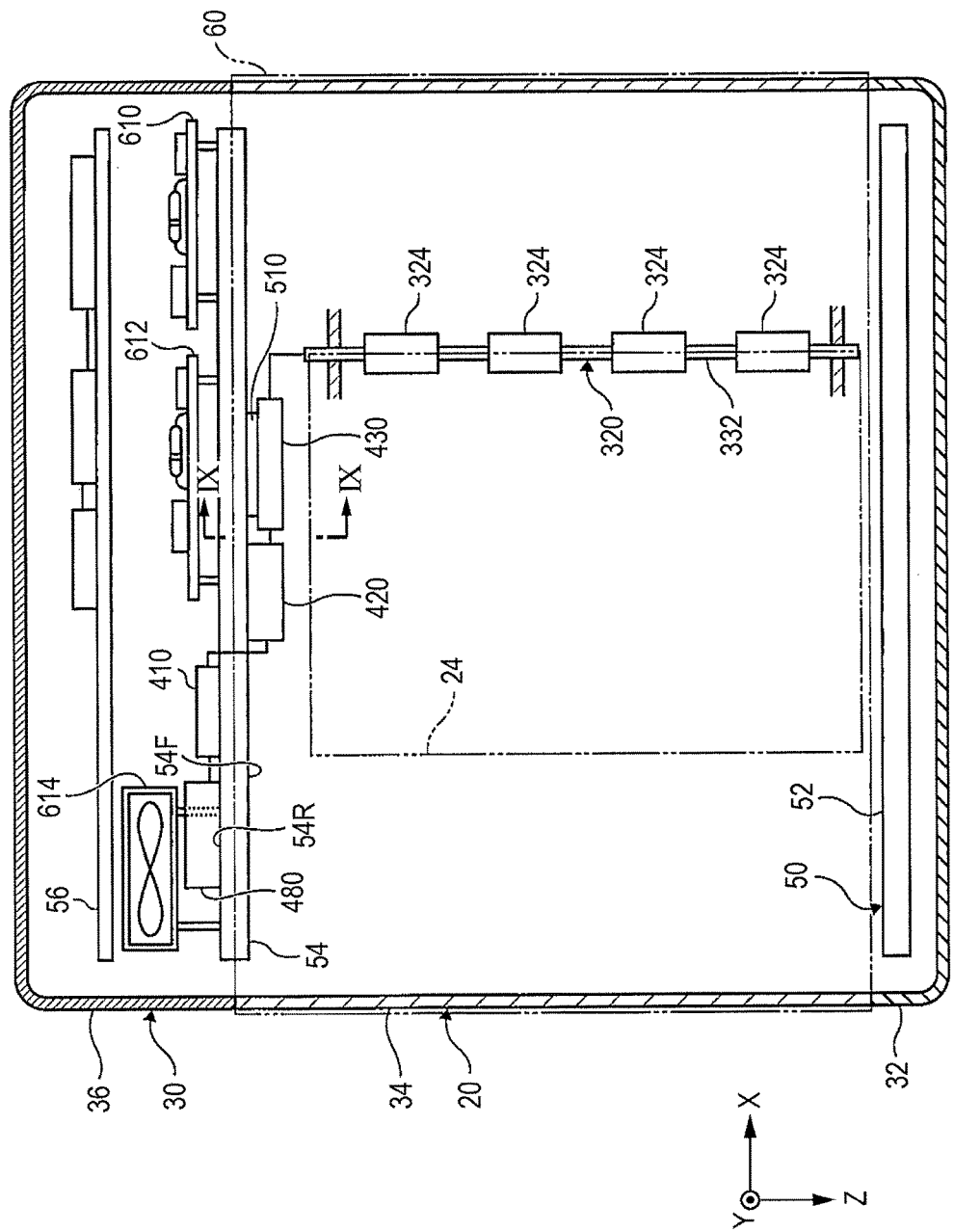
FIG. 5 is a cross-sectional view showing a cross section taken along plane D shown in FIG. 1 of the image forming apparatus shown in FIG. 1 when viewed from the upper side.

FIG. 5 is a cross-sectional view showing a cross section taken along plane D shown in FIG. 1 of the image forming apparatus 10 when viewed from the upper side (the arrow c side in FIG. 1). As shown in FIG. 5, the image forming apparatus body 20 includes an outer covering part 30 and a body frame part 50. The outer covering part 30 forms outer walls of the image forming apparatus 10. The outer covering part 30 includes a front covering member 32, a rear covering member 36, and a center covering member 34 positioned between the front covering member 32 and the rear covering member 36. The front covering member 32, the center covering member 34, and the rear covering member 36 may be detached from the body frame part 50, for example, individually.

The body frame part 50 is arranged in the space surrounded by the outer covering part 30. The body frame part 50 includes a front frame member 52, a rear frame member 56, and a center frame member 54 positioned between the front frame member 52 and the rear frame member 56. The center frame member 54 is used as a support member that supports the transmission unit 430, and supports the transmission unit 430. To be more specific, the transmission unit 430 is attached to a front surface 54F of the center frame member 54 through an intermediate bracket member 510.

As described above, the intermediate bracket member 510 couples the transmission unit 430 with the center frame member 54, and is used as a coupling member. The details of the intermediate bracket member 510 are described later.

The transmission unit 430 is attachable to and detachable from the image forming apparatus body 20, that is, the transmission unit 430 is attachable to and detachable from the center frame member 54. The transmission unit 430 is attached to and detached from the center frame member 54 through an opening 60 that is formed to face upward in the image forming apparatus body 20 by detaching the center covering member 34 from the body frame part 50. FIG. 5 illustrates the opening 60 by imaginary lines (two-dot chain lines). As described above, the image forming apparatus body 20 allows the opening 60 for attachment and detachment of the transmission unit 430 to be formed.

The transmission unit 430 is attached to and detached from the image forming apparatus body 20, for example, for repair of the first clutch 442 or the second clutch 444 (for each member, see FIG. 4) and for maintenance such as replacement of the first clutch 442 or the second clutch 444. In repair, the transmission unit 430 is detached from the image forming apparatus body 20 through the opening 60, the first clutch 442 or the like is repaired while the transmission unit 430 is detached from the image forming apparatus body 20, and the transmission unit 430 with the repaired first clutch 442 or the like is attached to the image forming apparatus body 20 again through the opening 60. Also, in replacement, the transmission unit 430 is detached from the image forming apparatus body 20 through the opening 60, and, for example, another unused transmission unit 430 different from the detached transmission unit 430 is attached to the image forming apparatus body 20 through the opening 60.

Also, as shown in FIG. 5, the above-described second transmission mechanism 420 is attached to the front surface 54F of the center frame member 54 in addition to the transmission unit 430. Also, the above-described first transmission mechanism 410 and the above-described motor 480 are attached to a rear surface 54R of the center frame member 54. Further, a substrate 610, a substrate 612, an air sending device 614, and other parts are attached to the rear surface 54R of the center frame member 54.

As described above, various parts etc. are attached to the rear surface 54R of the center frame member 54, and the rear frame member 56 is further arranged at the rear side (the upper side in FIG. 5) of the center frame member 54. Hence, when the transmission unit 430 is detached from the image forming apparatus body 20, if the work is performed from the rear side of the center frame member 54, after the rear covering member 36 is detached, it is required to detach the rear frame member 56 and to detach the various parts etc. attached to the rear surface 54R of the center frame member 54 from the center frame member 54 to ensure the space for the work.

In contrast, when the transmission unit 430 is detached from the image forming apparatus body 20, if the work is performed from the front side (the lower side in FIG. 5) of the center frame member 54, by detaching the center covering member 34, the space for the work is ensured between the center frame member 54 and the front frame member 52.

Also, by detaching the center covering member 34, the opening 60 is formed as described above. This allows the transmission unit 430 to be attached to and detached from the image forming apparatus body 20 through the opening 60.

Figure 6:
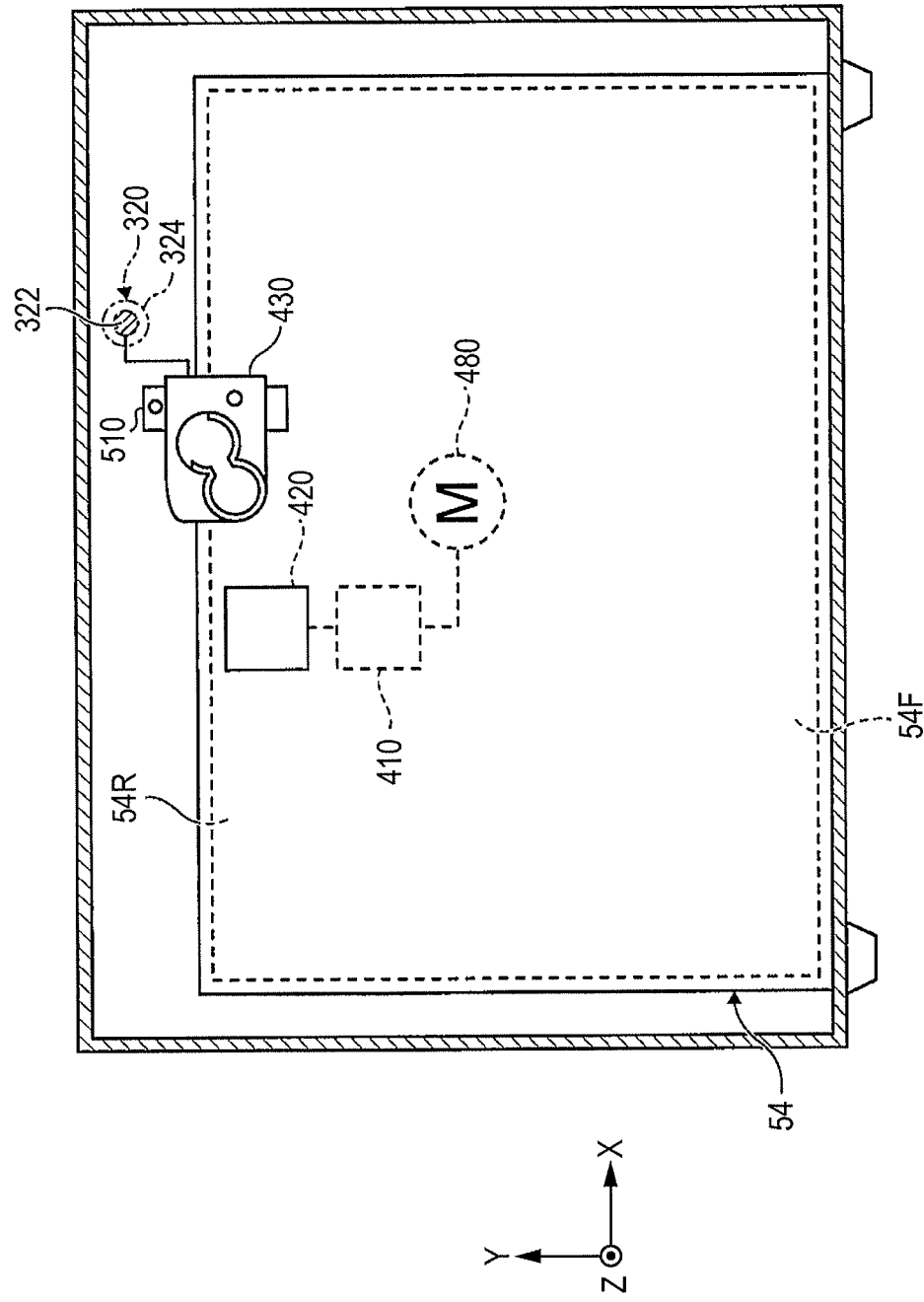
FIG. 6 is a cross-sectional view showing a cross section taken along plane B shown in FIG. 1 of the image forming apparatus shown in FIG. 1 when viewed from the front side.

FIG. 6 is a cross-sectional view showing a cross section taken along plane B shown in FIG. 1 of the image forming apparatus 10 when viewed from the front side (the arrow a side). FIG. 7 is a cross-sectional view showing a cross section taken along plane C shown in FIG. 1 of the image forming apparatus 10 when viewed from the rear side (the arrow b side). As described above, the transmission unit 430 is attached to the front surface 54F of the center frame member 54 through the intermediate bracket member 510. Also, as described above, the second transmission mechanism 420 is attached to the front surface 54F of the center frame member 54, and the first transmission mechanism 410 and the motor 480 are attached to the rear surface 54R of the center frame member 54.

Figure 8B:
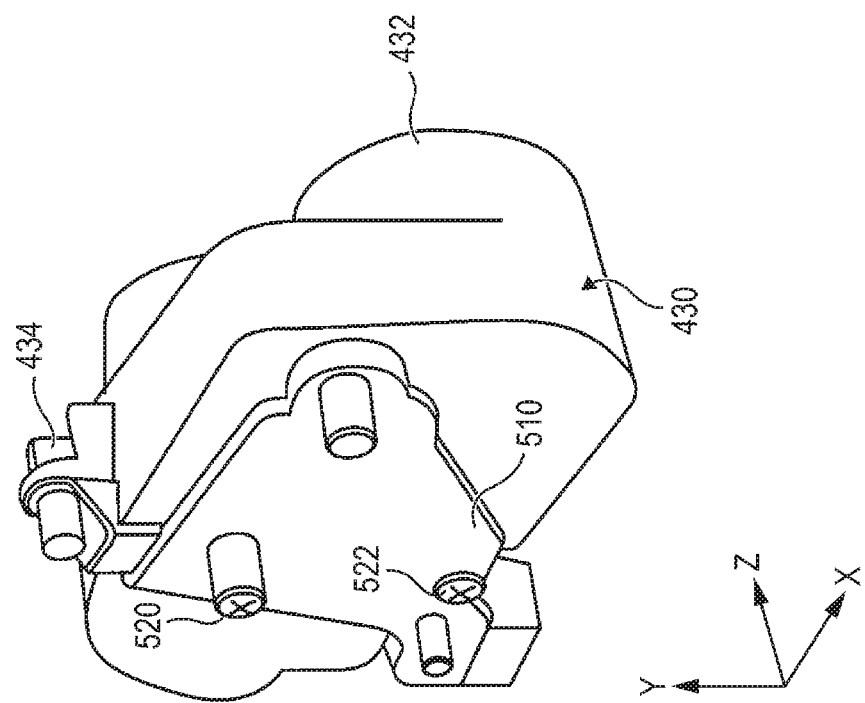
FIGS. 8A and 8B illustrate the transmission unit shown in FIG. 3, FIG. 8A being a first perspective view, FIG. 8B being a second perspective view.
Figure 8A:
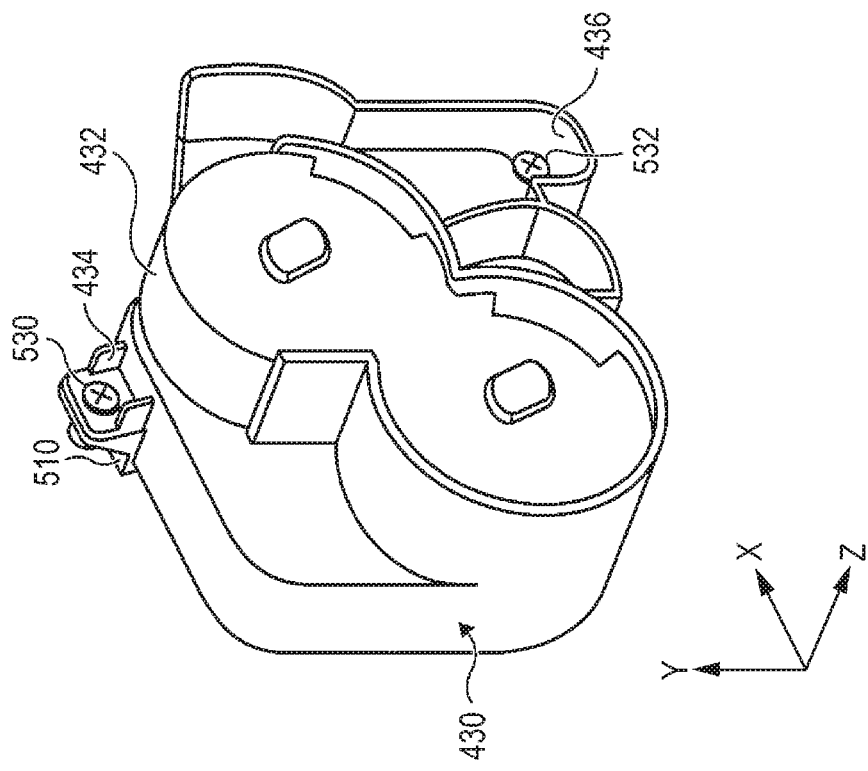

FIGS. 8A and 8B illustrate the transmission unit 430 and the intermediate bracket member 510. As shown in FIGS. 8A and 8B, the transmission unit 430 includes a transmission unit body 432. The transmission unit 430 houses therein the above-described first clutch 442, regular rotation transmission mechanism 446, second clutch 444, and reverse rotation transmission mechanism 448 (for each member, see FIG. 4).

Also, as shown in FIGS. 8A and 8B, the intermediate bracket member 510 and the transmission unit 430 are fixed to each other by using second screws 530 and 532. In this case, each of the second screws 530 and 532 is used as a second fixing tool. Instead of fixing the intermediate bracket member 510 and the transmission unit 430 by using the two second screws, the intermediate bracket member 510 and the transmission unit 430 may be fixed by using three or more second screws.

Also, as shown in FIGS. 8A and 8B, the transmission unit 430 includes fall preventing portions 434 and 436 that prevent the second screws 530 and 532 detached from the intermediate bracket member 510 and the transmission unit 430 from falling. The fall preventing portion 434 includes a surface arranged at the lower side in the gravity direction of the detached second screw 530 and two side surfaces positioned at both sides of the detached second screw 530. The fall preventing portion 436 includes a surface arranged at the lower side in the gravity direction of the detached second screw 532 and two side surfaces positioned at both sides of the detached second screw 532.

Also, FIG. 8B illustrates a state in which first screws 520 and 522 that fix the intermediate bracket member 510 and the center frame member 54 (for example, see FIG. 5) to each other are attached to the intermediate bracket member 510. In this case, each of the first screws 520 and 522 is used as a first fixing tool. Instead of fixing the intermediate bracket member 510 and the center frame member 54 by using the two first screws, the intermediate bracket member 510 and the center frame member 54 may be fixed by using three or more first screws.

Figure 9:
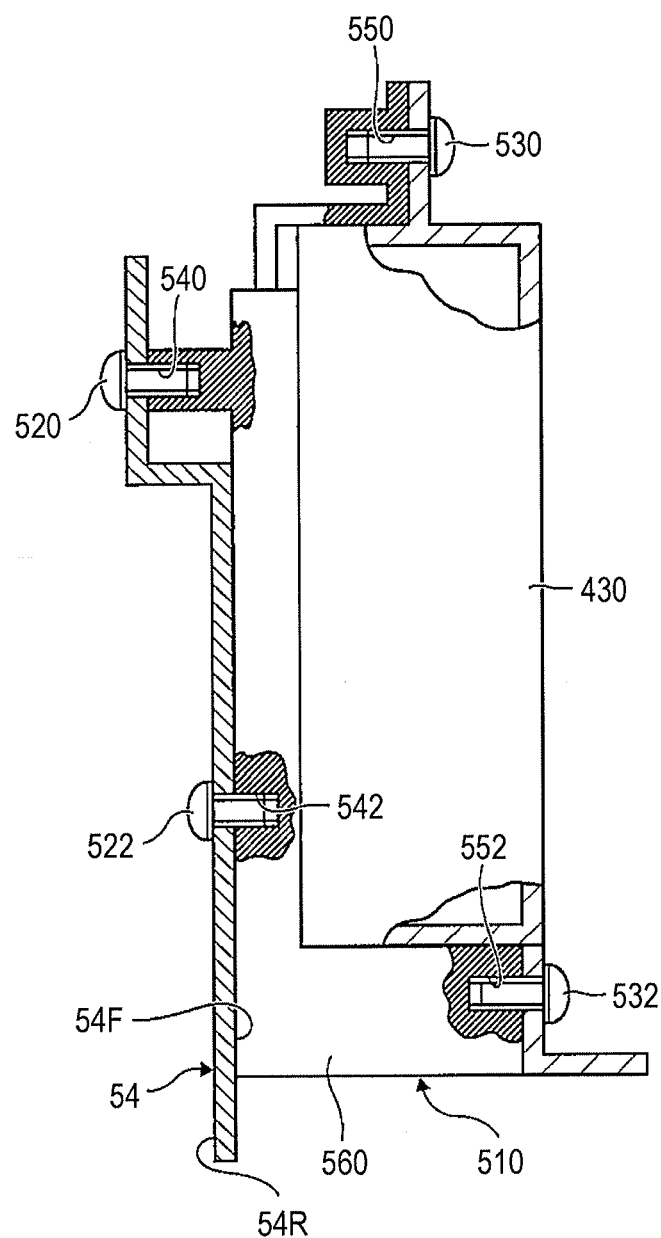
FIG. 9 is an illustration showing a configuration for attaching the transmission unit shown in FIGS. 8A and 8B to a support member in a view taken along arrow IX-IX shown in FIG. 5.

FIG. 9 illustrates a configuration that fixes the transmission unit 430 to the center frame member 54. As described above, the transmission unit 430 is fixed to the center frame member 54 through the intermediate bracket member 510.

As shown in FIG. 9, the intermediate bracket member 510 has formed therein a first screw hole 540 to which the first screw 520 is attached, and a first screw hole 542 to which the first screw 522 is attached. In this case, each of the first screw holes 540 and 542 is used as a first attachment portion. Also, as shown in FIG. 9, the intermediate bracket member 510 has formed therein a second screw hole 550 to which the second screw 530 is attached, and a second screw hole 552 to which the second screw 532 is attached. In this case, each of the second screw holes 550 and 552 is used as a second attachment portion.

As described above, the center frame member 54 and the intermediate bracket member 510 are fixed by using the first screws 520 and 522, and the intermediate bracket member 510 and the transmission unit 430 are fixed by using the second screws 530 and 532.

Also, as shown in FIG. 9, the first screws 520 and 522 are attached to the first screw holes 540 and 542 from the side of the rear (left in FIG. 9) surface 54R being the first surface of the center frame member 54. In contrast, the second screws 530 and 532 are attached to the second screw holes 550 and 552 from the side of the front (right in FIG. 9) surface 54F being the second surface of the center frame member 54.

Also, as shown in FIG. 9, the intermediate bracket member 510 has a support portion 560 that supports the transmission unit 430 from the lower side in the gravity direction.

Also, as shown in FIG. 9, the second screw holes 550 and 552 being plural second screw holes and more particularly two second screw holes are arranged so that the larger the distance of one of the second screw holes from the opening 60 (see FIG. 5) is, the larger the distance of the second screw hole from the center frame member 54 is. That is, the second screw holes 550 and 552 are arranged so that the second screw hole 552 at a larger distance from the opening 60 than the distance of the second screw hole 550 from the opening 60 has a larger distance from the center frame member 54 than the distance of the second screw hole 550 from the center frame member 54.

Since the second screw holes 550 and 552 are arranged as described above, as compared with a case in which the second screw holes 550 and 552 are at equivalent distances from the center frame member 54 and a case in which the distance of the second screw hole 550 from the center frame member 54 is larger than the distance of the second screw hole 552 from the center frame member 54, the second screw hole 552 may be easily recognized from the outside of the opening 60, and the second screw 532 may be easily attached to the second screw hole 552.

FIGS. 10A and 10B explain a process of attaching the transmission unit 430 to the center frame member 54. To attach the transmission unit 430 to the center frame member 54, as shown in FIG. 10A, the transmission unit 430 is first fixed to the intermediate bracket member 510 by using the second screws 530 and 532. Fixing the transmission unit 430 to the intermediate bracket member 510 is not required to be executed inside the image forming apparatus body 20, and may be executed at a position other than the inside of the image forming apparatus body 20.

Then, the intermediate bracket member 510 with the transmission unit 430 fixed is fixed to the center frame member 54 by using the first screws 520 and 522. At this time, the first screws 520 and 522 are attached to the first screw holes 540 and 542 from the rear side (the left side in FIG. 10B) of the center frame member 54.

Fixing the intermediate bracket member 510 to the center frame member 54 is executed when the image forming apparatus 10 is manufactured. When the intermediate bracket member 510 is fixed to the center frame member 54, for example, the substrate 610 (see FIG. 5) or another part is not attached to the rear surface 54R of the center frame member 54 yet, the rear frame member 56 (see FIG. 5) is not attached yet, or the rear covering member 36 is not attached yet. Hence, the space for the work is ensured at the rear side of the center frame member 54.

FIGS. 11A and 11B explain a process of detaching the transmission unit 430 from the center frame member 54. When the transmission unit 430 is detached from the center frame member 54, as shown in FIG. 11A, the second screw 530 is first detached from the second screw hole 550, and the second screw 532 is detached from the second screw hole 552. Detaching the second screws 530 and 532 is executed, for example, for replacement of the transmission unit 430, and is executed after the image forming apparatus 10 is shipped from the factory.

Hence, for example, the substrate 610 (see FIG. 5) and other members are already attached to the rear surface 54R of the center frame member 54, and the rear frame member 56 (see FIG. 5) is already attached. Owing to this, the space for the work is not ensured at the rear side of the center frame member 54. Therefore, the second screws 530 and 532 are detached, for example, by inserting a tool such as a screw driver into the image forming apparatus body 20 and detaching the second screws 530 and 532 from the front side (the right side in FIG. 11A) of the center frame member 54, through the opening 60 (see FIG. 5).

Then, as shown in FIG. 11B, the transmission unit 430 is detached from the intermediate bracket member 510 fixed to the center frame member 54, and the detached transmission unit 430 is removed to the outside of the image forming apparatus body 20 through the opening 60.

As described above, the transmission unit 430 is attachable to the center frame member 54 by the work from the rear side of the center frame member 54 being the side of the first surface of the center frame member 54, and the transmission unit 430 is detachable from the center frame member 54 by the work from the front side of the center frame member 54 being the side of the second side of the center frame member 54.

As described above, the exemplary embodiment of the present invention may be applied to a drive transmission apparatus, and an image forming apparatus, such as a copier, a facsimile apparatus, or a printer.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A drive transmission apparatus comprising:
a drive source;
a rotating member configured to rotate by receiving a drive transmitted from the drive source;
a structure that is attachable to and detachable from a drive transmission apparatus body and houses at least a portion of a transmission mechanism configured to transmit the drive transmitted from the drive source to the rotating member;
a support member that has a first surface and a second surface, and supports the structure; and a coupling member that is fixed to the support member by using a first fixing tool, is fixed to the structure by using a second fixing tool, and couples the structure with the support member, wherein the coupling member includes:
- a first attachment portion to which the first fixing tool is attachable from a side of the first surface of the support member; and
- a second attachment portion to which the second fixing tool is attachable from a side of the second surface of the support member, and wherein the structure includes a fall preventing portion configured to prevent the second fixing tool detached from the second attachment portion from falling.

2. The drive transmission apparatus according to claim 1, wherein the coupling member includes a support portion that supports the structure from a lower side in a gravity direction.

3. The drive transmission apparatus according to claim 1,
- wherein the drive transmission apparatus body is configured to allow an opening for attachment and detachment of the structure to be formed,
- wherein the second fixing tool includes a plurality of the second fixing tools, the structure is fixed to the coupling member by using the plurality of second fixing tools, the second attachment portion includes a plurality of the second attachment portions, and the plurality of second attachment portions are formed to respectively correspond to the plurality of second fixing tools, and
- wherein the plurality of second attachment portions are arranged so that the larger a distance of one of the second attachment portion from the opening is, the larger a distance of the second attachment portion from the support member is.

4. The drive transmission apparatus according to claim 1,
- wherein the transmission mechanism includes a switch mechanism configured to switch a rotation direction of the rotating member, and
- wherein the switch mechanism is housed in the structure.

5. An image forming apparatus comprising:
- an image forming unit configured to form an image on a recording medium;
- a drive source;
- a rotating member configured to rotate by receiving a drive transmitted from the drive source, and configured to transport the recording medium;
- a structure that is attachable to and detachable from an image forming apparatus body and houses at least a portion of a transmission mechanism configured to transmit the drive transmitted from the drive source to the rotating member;
- a support member that has a first surface and a second surface, and supports the structure; and
- a coupling member that is fixed to the support member by using a first fixing tool, is fixed to the structure by using a second fixing tool, and couples the structure with the support member, wherein the coupling member includes:
- a first attachment portion to which the first fixing tool is attachable from a side of the first surface of the support member; and
- a second attachment portion to which the second fixing tool is attachable from a side of the second surface of the support member, and wherein the structure includes a fall preventing portion configured to prevent the second fixing tool detached from the second attachment portion from falling.

* * * * *